No. 677,412. Patented July 2, 1901.
A. B. HARMON.
WEB HOLDING DEVICE FOR WAGE SCALES, &c.
(Application filed Apr. 5, 1900.)
(No Model.) 2 Sheets—Sheet 1.
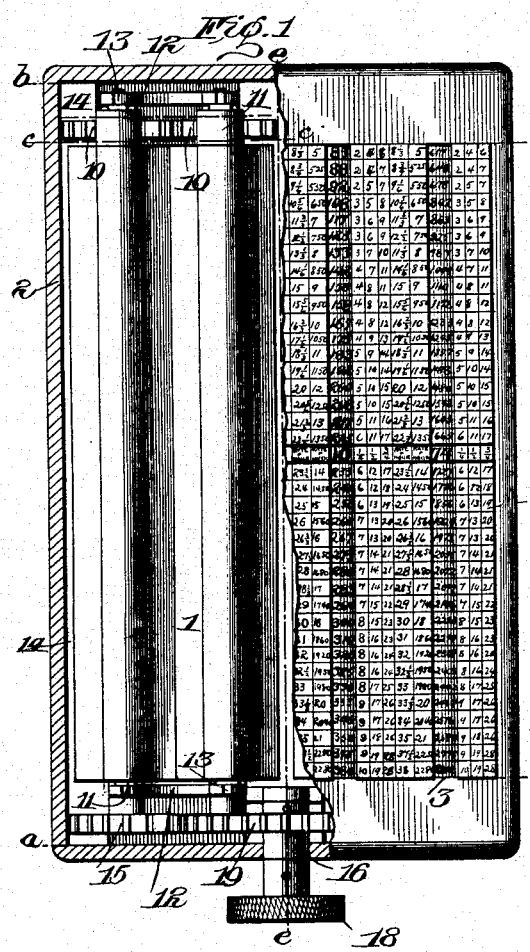
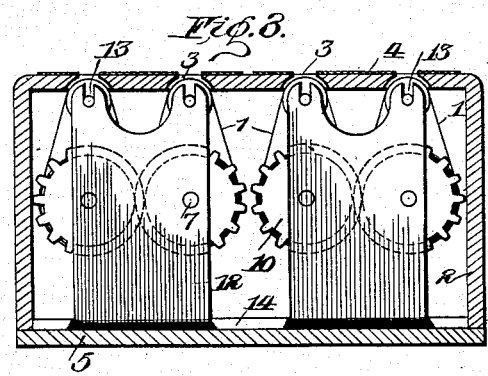
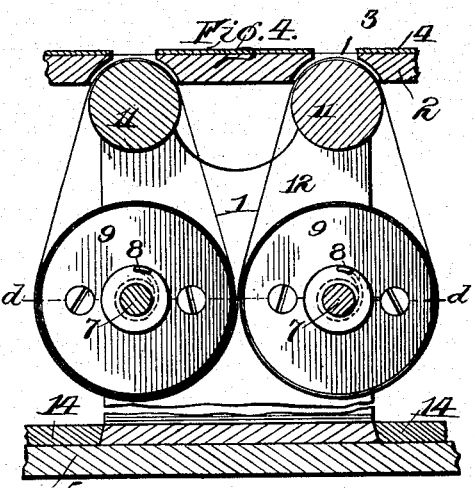
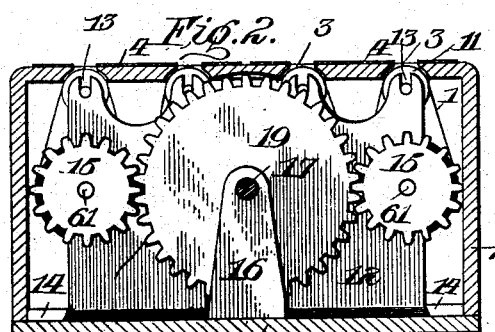
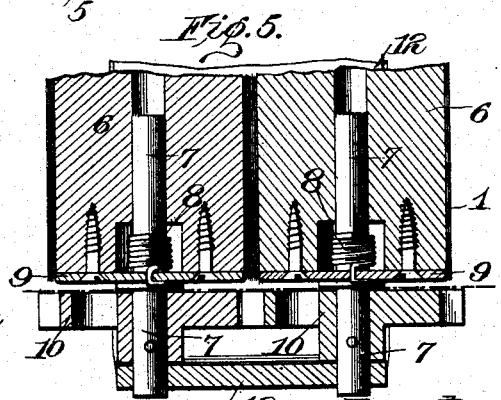
Witnesses:
Walter B. Payne.
G. Willard Rich.
Inventor
Aman B. Harmon
by Church & Church
his Attorneys.

No. 677,412. Patented July 2, 1901.
A. B. HARMON.
WEB HOLDING DEVICE FOR WAGE SCALES, &c.
(Application filed Apr. 5, 1900.)
(No Model.) 2 Sheets—Sheet 2.

UNITED STATES PATENT OFFICE.

ANAN B. HARMON, OF ROCHESTER, NEW YORK.

WEB-HOLDING DEVICE FOR WAGE-SCALES, &c.

SPECIFICATION forming part of Letters Patent No. 677,412, dated July 2, 1901.

Application filed April 5, 1900. Serial No. 11,752. (No model.)

*To all whom it may concern:*

Be it known that I, ANAN B. HARMON, of Rochester, in the county of Monroe and State of New York, have invented certain new and useful Improvements in Web-Holding Devices for Wage-Scales, Interest-Tables, &c.; and I do hereby declare the following to be a full, clear, and exact description of the same, reference being had to the accompanying drawings, forming a part of this specification, and to the reference-numerals marked thereon.

My present invention relates to the device for carrying and moving sheets or flexible webs containing tables or numbers, such as wage or interest tables, adapted to be used in connection with a scale or index, so that the operator after adjusting the sheets in proper relation to the scale or index may determine at a glance the amount of wages or interest due at a certain rate and for a certain specified period of time. The apparatus itself is particularly adapted for use in connection with scales or indices; but it may be used for holding and operating webs or sheets containing any desired markings or pictures, &c., which it is desirable or necessary to display at a certain point, either with or without a coöperating scale or index, all as will be hereinafter described, and the novel features pointed out in the claims at the end of this specification.

Figure 6:
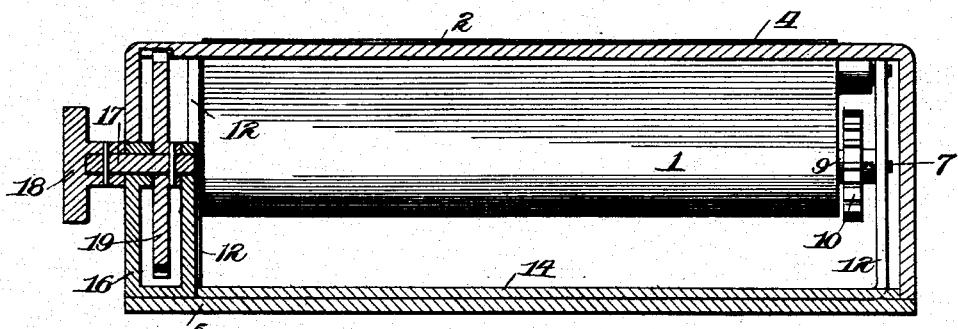
Figure 7:
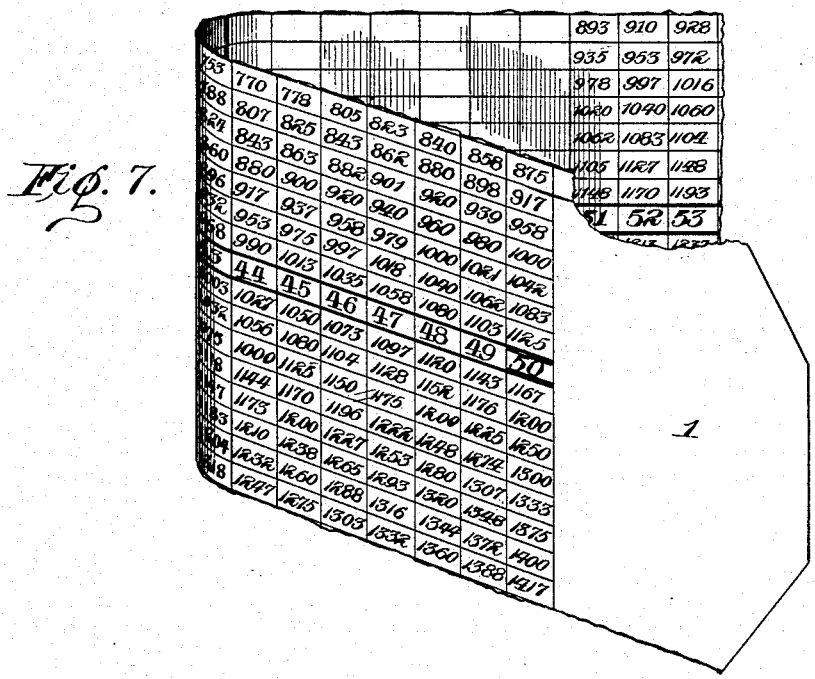

In the drawings, Figure 1 is a plan view of a wage-computing device constructed in accordance with my invention, a portion of the casing being broken away to show the webs and rollers beneath; Fig. 2, a cross-sectional view on the line $a\,a$ of Fig. 1; Fig. 3, a cross-sectional view on the line $b\,b$ of Fig. 1 looking downward; Fig. 4, a cross-sectional view on the line $c\,c$ of Fig. 1; Fig. 5, a horizontal sectional view on the line $d\,d$ of Fig. 4; Fig. 6, a longitudinal sectional view on the line $e\,e$ of Fig. 1; Fig. 7, a detached view of the web or sheet containing the tables or marks to be exhibited.

Similar reference-numerals in the several figures indicate similar parts.

In the present embodiment of my invention I have shown the apparatus provided with two webs or continuous sheets (indicated by 1) for containing the tables, said sheets being printed upon both sides, as shown in Fig. 7, and I therefore provide an inclosing casing, (indicated by 2,) having at its upper side four apertures 3, in proximity to which the surface of the sheets or webs are adapted to be held to permit ready inspection of the figures or numbers contained on the sheets, in connection with certain indicating or index slips 4, arranged on the sides of said apertures, as shown in Fig. 3. The lower edges of the casing rest upon and coöperate with a base-board 5, upon which the operating parts of the device are mounted. As the general construction and operation of both webs or sheets are the same, a description of one of them will answer for both.

The ends of the webs 1 are attached to rollers or drums 6, having at one end journals or pins 61, operating in apertures formed in suitable bearing-plates, and at the other ends the said rollers are journaled upon pins or bearing-studs 7, entering recesses in the ends of the rollers and connected thereto through springs 8, one end of each of said springs being attached to the studs 7 and the other to a plate 9 on the end of the roller, as shown in Fig. 4. The outer ends of the studs 7 are secured rigidly to gear-wheels 10, arranged inside of the bearing-plates, and the gears on adjacent rollers carrying the same web intermesh, so as to cause their operation in opposite directions. The web extends from one of the rollers 6 up over a guide roller or support 11, held in bearings just beneath the slot 3 in the casing, thence down beneath the other roller 6, thence up over the other guide-roller 11, thence downward again, and is attached to the corresponding roller 6 of the pair. The guides or rollers 11 are simply for the purpose of bringing the slots or apertures in the casing close together and allowing the web-rollers to be brought close together to cause the gears to intermesh and also to engage with the operating-gear. The spring connection between the rollers and their operating studs or pins 7, being, in effect, between the ends of the web and the rollers, is simply for the purpose of keeping the belts or webs taut, and the manner of running the webs (shown clearly in Fig. 4) is such that the printing or marking on one side of the web is exposed through one of the apertures 3 (say the one next the edge of the casing) and the markings or figures on the other side of the web are exposed through the next adjacent slot or aperture 3, and by this arrangement I am enabled to employ a single web printed upon both sides, so that the figures or marks are visible and may be consulted and manipulated without the necessity of employing an extra long web or sheet or operating the web a long distance when it is desired to consult the figures or tables representing widely-separated numbers or days. As stated, I preferably employ two separate webs in the present embodiment, and the support for the rollers of each web is composed of a single metal plate 12, bent up at the ends to form suitable apertures for receiving the studs on the ends of the rollers 6 and above these the open slots 12 for the reception of pins or journals at the ends of the guide-rollers 11, the lower edges of said plates being laterally extended somewhat to engage with the undercut blocks or strips 14 on the base-board or support 5 of the casing, so that the supports carrying the rollers may be removed from the base by sliding them longitudinally when the casing is removed. At one end of the outside roller 6 of each pair and preferably outside of the end of the supporting-plate 12 are provided gears 15, and secured to the base-plate is a bracket 16, having journaled in its upper portion a spindle or arbor 17, provided at its outer end with a knob or handle 18 and inside the bracket with the gear 19, meshing with both the gears 15 on the ends of the spindles 6. It will be understood that by turning the operating handle or knob 18 all of the web-rollers may be turned to bring successive portions of the web or webs in position beneath the openings 3 of the casing.

As before stated, the webs or sheets may bear any suitable marks or numbers; but for a wage-scale I prefer to print upon them transversely-extending rows of figures indicating the rate of wages per hour from four cents per hour upward, and in lines extending longitudinally of the web figures or numbers indicating the different amounts due each successive hour at the rates indicated by the figures in the first column. In each of the columns extending transversely of the web and about midway thereof are arranged certain figures from "1" to "100," or more, if desired, and preferably in large type, representing the number of hours for which the figures or amounts in the column above and below it indicate wages. The scale on one side of each of the slots 3 in the casing—say at the left-hand side—contains a column of figures corresponding in number and position to the transverse columns on the web and indicating the amount of wages per week of sixty hours at the rate which is shown in the next column on the scale to the left. On the right-hand side of each of the apertures 3 is arranged a scale, the figures thereon being in line with the longitudinal rows on the web, indicating the amount of wages for each quarter of an hour, half an hour, and three-quarters of an hour at the rate per hour indicated in the first column of the scale in line therewith on the other side of the slot or aperture 3. At the center of the two scales and in line with the center large figures of the web are printed words designating the various columns or scales—to wit, in the first column the words "Rate per hour," in the next column "Rate per week," "¼" indicating a quarter of an hour, and "½" and "¾" indicating one-half and three-quarters of an hour, respectively, as shown particularly in Fig. 1.

In using the device it is only necessary for the operator in figuring up the amount due a workman to ascertain the number of hours he has worked and the rate per week or per hour, as the case may be. Then by manipulating the handle 18 and turning the web or webs until the appropriate number of hours indicated by the central figures on the web is in line with the slot or aperture, and then the figures on the web in line with the rate per hour or per week will be visible through the slot, and if the workman has been present for a fraction of an hour it is only necessary to add to the amount shown in the slot in the casing the amount indicated in the appropriate column at the right of the slot. Thus if the rate per week were thirteen dollars and a workman has been present ten and one-half hours there will be due him "$2.17," which is the number shown upon the web in line with the central figure "10," indicating ten hours and opposite the figure indicating thirteen dollars per week, to which must be added eleven cents for the half-hour indicated by the figure appearing in the second column of the scale to the right of the slot, the total being two dollars and twenty-eight cents.

Instead of having both of the webs marked and with the figures indicating the rate of wages, it will be understood that upon one side of one web may be indicated wage rates from one hour to fifty and on the other side from fifty to one hundred, and upon the other web may be arranged interest-tables or other indications, as desired.

A single web can be used, if desired, the casing being made half the width shown and one of the webs and rollers only being capable of operation from the exterior of the casing, and although I prefer to use both sides of the web the printing on one side could be dispensed with and the web extended from one roller 6 over one roller 11 and then attached directly to the other roller 6.

When the casing is removed from the base, the webs can be changed or removed by lifting out the guide-rollers 11, or, if desired, the frames 12, carrying the rollers, may be removed bodily by sliding them longitudinally of the base-plate.

I claim as my invention—

1. In a web-holding device, the combination with the base, a removable casing extending over and coöperating with the base and having an aperture therein, of a removable holding-frame and web-holding rollers journaled therein, said frame being detachable from the base by a longitudinal movement, and a web attached at its ends to the rollers and guided in proximity to the aperture in the casing.

2. In a web-holding device, the combination with a base, and a removable casing coöperating with the base and having an aperture therein, of a removable frame in the casing having web-holding rollers, a web or sheet connected to the rollers, guides for holding the web in proximity to the aperture in the casing, and a roller-operating device on the base detachably engaged with one of the web-rollers.

3. In a web-holding device, the combination with a base, a removable casing coöperating with the base and having an aperture therein, of a removable frame in the casing, the web-holding rollers journaled therein, a web or sheet attached at its ends to the rollers, and guides for the web, a gear on one of said rollers, an operating-gear on the base adapted to engage with the roller-gear and a stationary frame or bracket mounted on the base and supporting the operating-gear.

4. In a web-holding device, the combination with a base, the bracket thereon, and the operating-gear mounted on the bracket, of the removable casing having the aperture, the frame detachably connected to the base, the web-rollers geared together and mounted thereon, the gear on one of the rollers adapted to mesh with the operating-gear, and a web connected to the rollers.

5. In a web-holding device, the combination with a base, an operating-gear thereon, and a removable casing having apertures, of two pairs of rollers arranged in the casing, the rollers of each pair being geared together and one roller of each engaged by the operating-gear and webs or sheets connected to each roller.

6. The combination with the casing, of a removable frame therein embodying the plates at the ends, having open bearings at the top, supporting-rollers in the bearings, two rollers journaled in the plates, gearing connecting them, and a web having markings on both sides connected at its ends to the rollers and extending over the supports successively with both sides outwardly.

7. The combination with a base having the guides, a frame supported on and movable longitudinally of the guides, the rollers journaled in the frame and connected for simultaneous operation in opposite directions, of the web-sheet having markings upon its opposite sides connected at its ends to the rollers, the gear upon one of the rollers, an operating-gear engaging therewith, and a bracket supporting the latter and secured to the base.

8. The combination with a base having the guides, a frame movably supported on the base and held by the guides, the rollers supported in the frame and provided with intermeshing gears upon one end, and the gear upon the opposite end of one of the rollers, of the operating-gear supported in bearings stationary on the base, the web, having markings upon its opposite sides connected at its opposite ends to the rollers, and the removable casing coöperating with the base and inclosing the parts and provided with the apertures arranged above the rollers.

9. The combination with a base, a frame secured thereon, the rollers journaled in the frame having the intermeshing gears upon one end, and the gear upon the opposite end of one of the rollers, of the operating-gear supported on the base and meshing with the last-mentioned gear, the sheet or web having the markings upon its opposite sides connected at its ends to the rollers, the removable casing coöperating with the base and inclosing the parts and provided with the slots or apertures above the rollers, and the handle connected to the operating-gear extending to the exterior of the casing.

10. The combination with a base having the guides, a frame movably attached to the base by said guides, and the rollers supported in the frame, the sheet or web having markings upon its opposite sides connected at its ends to the rollers, the guides for said sheet journaled in the frame above the rollers, and the intermeshing gears arranged upon one end of the latter, of the gear mounted upon the opposite end of one of the rollers, an operating-gear engaging therewith and supported in bearings stationary on the base and provided with an operating knob or handle, and the removable casing inclosing the parts having the slots arranged above the guides.

11. The combination with a base, separate frames arranged thereon, each provided with a pair of rollers connected for simultaneous operation in opposite directions, and sheets or webs having markings thereon connected at their ends to the rollers of each pair, of an operating-gear supported in a bearing mounted on the base, pinions arranged upon one of the rollers of each pair engaging the gear, whereby the separate webs may be operated together, and a removable casing inclosing the parts and provided with the slots above each roller.

ANAN B. HARMON.

Witnesses:
F. F. CHURCH,
G. WILLARD RICH.